Aug. 17, 1926.

E. J. KNAPP 1,596,192

CHANGE SPEED GEAR

Filed June 13, 1925        2 Sheets-Sheet 1

INVENTOR
Edward J. Knapp.
BY
ATTORNEY

Aug. 17, 1926.
E. J. KNAPP
1,596,192
CHANGE SPEED GEAR
Filed June 13, 1925
2 Sheets-Sheet 2
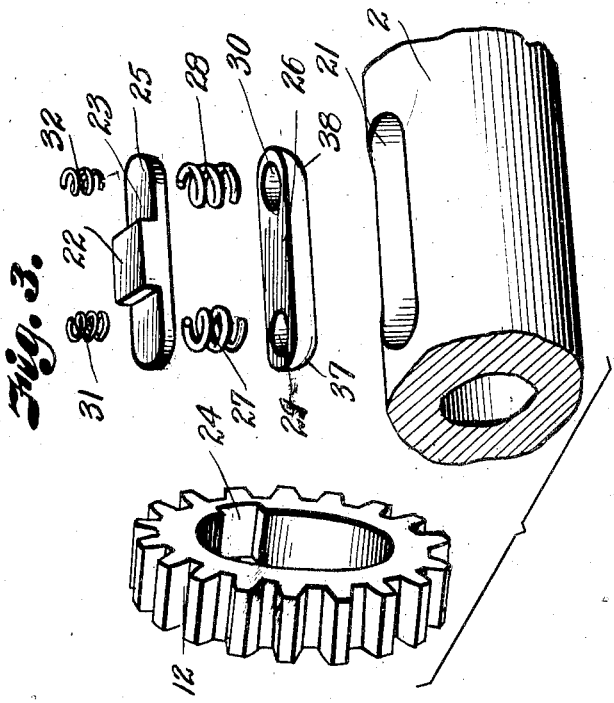
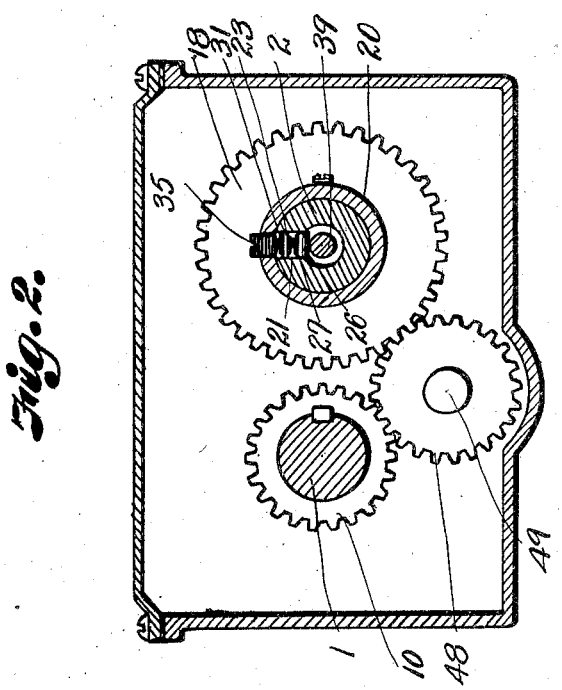
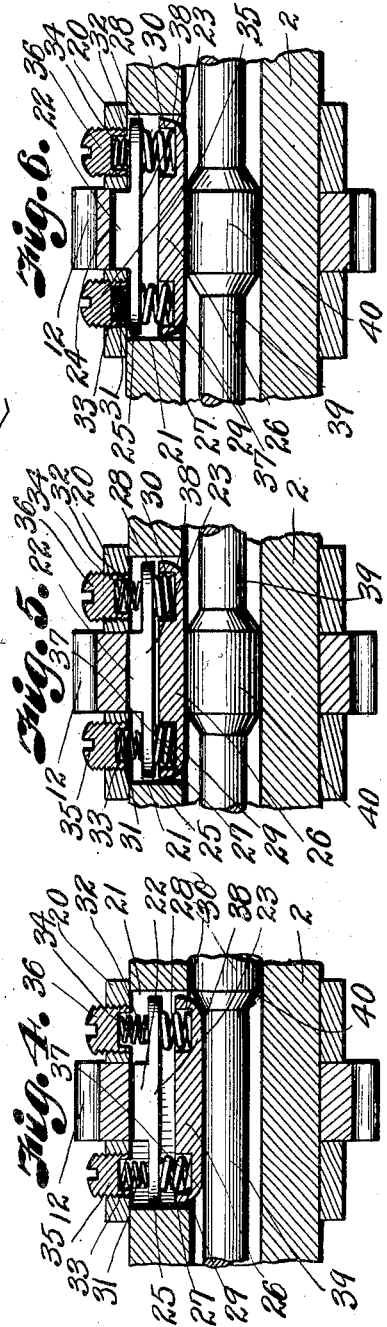
INVENTOR
Edward J. Knapp.
BY
ATTORNEY Patented Aug. 17, 1926.

1,596,192

UNITED STATES PATENT OFFICE.

EDWARD J. KNAPP, OF KANSAS CITY, MISSOURI.

CHANGE-SPEED GEAR.

Application filed June 13, 1925. Serial No. 36,908.

This invention relates to change speed mechanism, the primary object being to vary the speed of a driven shaft with respect to a driving shaft without throwing gears into and out of mesh.

One of the main objections to the standard shifting mechanism used on motor vehicles is that in shifting, certain gears are thrown out of mesh and certain other gears are thrown into mesh, and unless the shifts are made at the proper time the gears clash. Another disadvantage of the standard gear shift mechanism is that the clutch which connects the drive shaft of the motor to the driven shaft must be thrown out so that these two shafts are disconnected when changing from one speed to another, and in view of the necessity for disconnecting certain gears when other gears are brought into mesh, it is practical to have only three speeds forward and one reverse. With my invention it is possible to have an infinite number of forward speeds and a number of reverse speeds, but ordinarily two reverse speeds will be sufficient for all practical purposes.

According to my invention all of the gears on the driven shaft are in mesh with the gears on the drive shaft. One of the shafts, usually the driven shaft, is hollow, and on it loosely mounted is a plurality of gears which may be keyed to the shaft on which they are mounted by a longitudinally movable shifter, so that any one gear may be selected as part of the mechanism for transmitting power from the drive shaft to the driven shaft.

Since the selector or shifter moves rectilineally within one of the shafts, it is obvious that the number of speeds at which the driven shaft may be rotated will be governed by the length of the shaft and the amplitude of movements of the selector.

The novelty of the invention will be understood by reference to the following description in connection with the accompanying drawings, in which:—

Fig. 2 is a cross sectional view showing a set of reversing gears in elevation.

Fig. 3 is a fragmentary perspective view of the hollow shaft, one of the selective gears, and one of the dogs and its actuating mechanism for engagement with the gear.

Fig. 4 is a longitudinal sectional view through part of the hollow shaft, showing one of the dogs in retracted position.

Fig. 5 is a like view showing one of the dogs in projected position to engage a notch in its gear, and Fig. 6 is a like view showing the dog in slot engaging position with respect to its gear.

Figure 1:
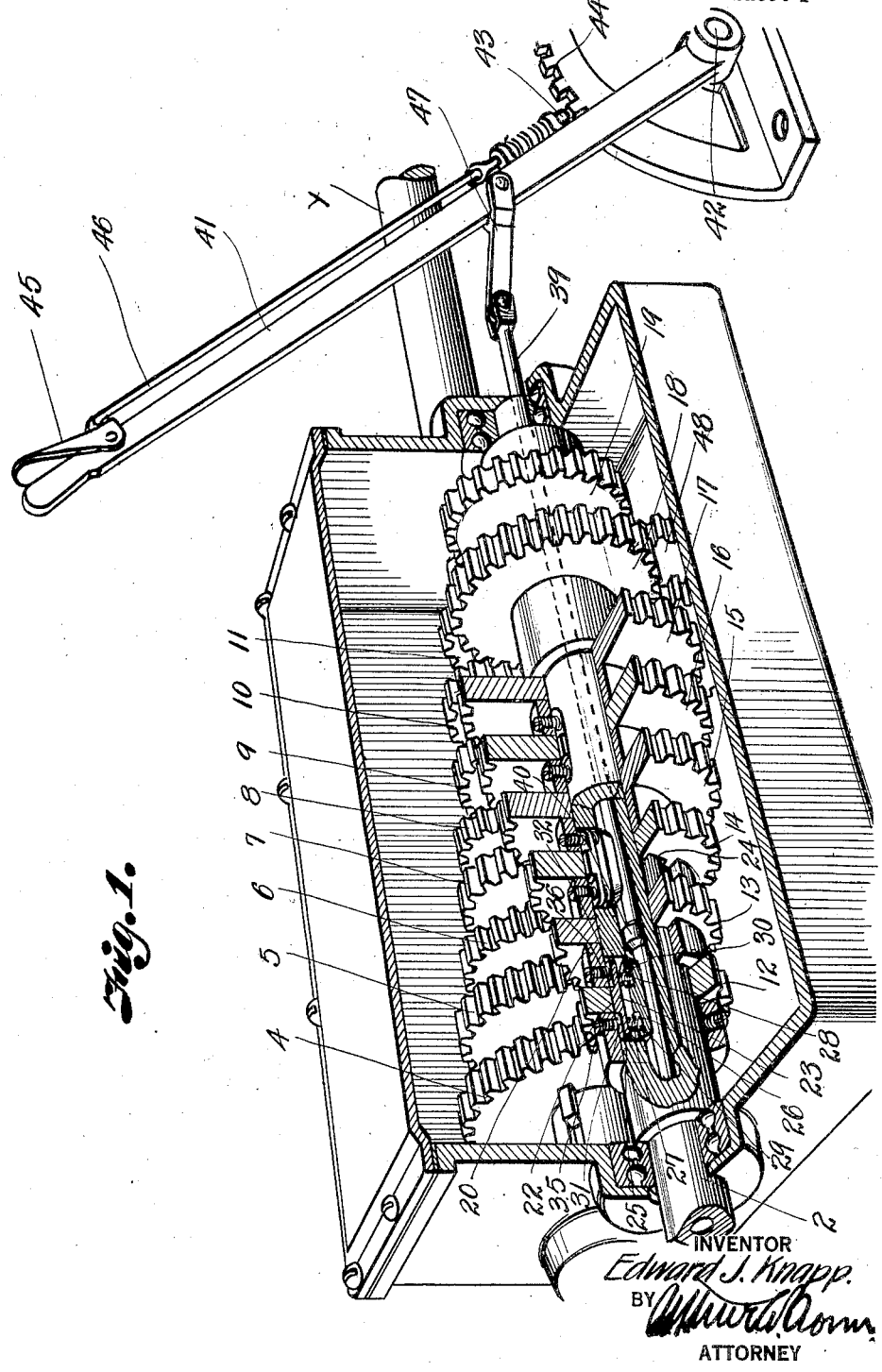
Fig. 1 is a perspective view of a change speed mechanism constructed in accordance with my invention, parts being broken away to illustrate the construction within the hollow shaft.

Referring now to the drawings by numerals of reference, 1 and 2 designate two parallel shafts, one of which is to be driven at a variable speed with respect to the other. Either shaft may be the drive shaft, but for convenience I will hereinafter refer to the shaft 1 as the drive shaft and the shaft 2 as the driven shaft.

The driven shaft and the drive shaft may be mounted in suitable bearings in a case into which appropriate lubricant may be introduced. On the drive shaft 1 is a plurality of gears 4, 5, 6, 7, 8, 9, 10 and 11 of different diameters. These are keyed or otherwise secured to the shaft 1 in an appropriate manner. The shaft 1 will be driven at a relatively uniform speed, and while the motor is operating it will be constantly rotating. Therefore all of the gears 4 to 11 will be constantly rotating. The shaft 2 will be appropriately connected to the driving axles of the vehicle. It will not rotate unless one of the selected gears 12, 13, 14, 15, 16, 17, 18, or 19 is made rigid with respect to the shaft 2. The mechanism for connecting and disconnecting the shaft 2 to the gears 12 to 19, both inclusive, is the important part of my invention. By reference to the drawings it will be observed that the gears 12 to 19 are held in predetermined spaced relation by collars 20 which are fast on the shaft 2, and between which the gears 12 to 19 are located.

The shaft 2 has a plurality of elongated slots 21 through which the teeth 22 of the dogs 23 may project to engage notches 24 in the gears 12 to 19. The dogs 23 consist of flat plates 25 which carry the teeth 22. Between the inner faces of the plates 25 and the spring compression plates 26 are coil springs 27 and 28. These bear against the inner faces of the plates 25 and are seated in recesses 29 and 30 in the plates 26. On top of the plates 25 are springs 31 and 32. These are weaker than the springs 27 and 28 and they are received in recesses 33 and 34 in the adjusting screws 35 and 36 carried by the collars so that the screws 35 and 36 can vary the compression of the springs 31 and 32, so that the springs will normally hold the dogs 23 out of engagement with the gears 12 to 19. The bottom faces of the plates or blocks 26 are curved, especially at their ends 37 and 38, the bottom faces of the members 26 riding upon a longitudinally slidable shift rod 39 having a selector 40 in the form of an enlargement or collar about the periphery of the rod which is adapted to move against the inner face or bottom of the member 26 to put the springs 27 and 28 under compression so that they will preponderate over the springs 31 and 32 and thereby exert a radial and outward movement to the selected dog to cause its tooth 22 to move against the inner face of its loose gear until the notch or slot 24 registers with the tooth 22 whereupon the tooth will snap into the slot or notch and cause the selected gear to rotate with the shaft 2, the result being that the shaft 2 will be driven at a speed determined by the diameter of the selected gear.

When the selector or collar 40 is moved out of engagement with one of the members 26, that is, when it is between any two members or gears on shaft 2, the change speed gear will be in "neutral". That is, the drive shaft may rotate, rotating the gears 12 to 19 without rotating the shaft 2, and consequently the driven shaft will not be turned. The rod 39 may be shifted longitudinally by a change speed gear shift lever 41 pivoted at 42 and having a spring-pressed pawl 43 to engage teeth on the rack 44, the pawl being withdrawn by the pivoted member 45 and the rod 46 in a manner common to ratchet levers. The lever 41 is fastened to the rod 39 by a link 47 in an appropriate manner. The gears 10, 11, 18 and 19 are the reverse gears. They are not in mesh, but each set meshes with a back gear 48 on a stub shaft 49, that is, there is a separate gear 48 for each set of reverse gears 10—18 and 11—19.

When the parts are properly assembled with the selector or collar 40 in "neutral" position, and the drive shaft is turning, no motion will be imparted to the driven shaft because the springs 31 and 32 being under compression, will tend to force the plates 25 toward the axis of the shaft 2, as indicated in Figure 4. The springs 27 and 28 at this time will not be under compression, so it may be said that the springs 31 and 32 preponderate over the springs 27 and 28.

When it is desired to throw the gears into mesh the rod 39 is moved longitudinally, preferably "through the gear" from low to the gear selected for the cruising speed, and as the collar 40 rides over the bottom face of each member 26, the springs 27 and 28 will be put under compression, preponderating over the springs 31 and 32, so that the tooth of the particular dog will be projected through one of the slots 21 to be in position to snap into its notch 24, making the gear fast to the shaft 2. Then the shaft 2 will be driven at the selected speed.

Of course it will be clearly understood that by providing a back gear 48 the gears 10 and 18 will cause a reverse movement of the shaft 2, and the gear similar to gear 48 in mesh with gears 11 and 19 will have the same effect. By providing the double springs, one set weaker than the other, the dogs for the respective loose gears will be caused to float in the shaft 2, that is, they will have no fixed positions, but as soon as the selector or collar 40 has been moved behind one of the plates 26 as shown in Figures 5 and 6, then the dog selected will become effective in causing its particular gear to be fast to shaft 2, and consequently, will cause the shaft 2 to be driven at the selected speed.

What I claim and desire to secure by Letters-Patent is:—

1. In combination, a drive shaft and a driven shaft, one of which is hollow, a plurality of gears loose on the hollow shaft, a plurality of dogs in the hollow shaft, each dog comprising a flat plate having a tooth projectable through a slot in the hollow shaft to engage a notch in one of the loose gears, a plate spaced from the inner face of each dog, springs between the outer face of each dog and the wall of the hollow shaft, springs between the two plates, and a selector in the hollow shaft slidable over the inner plates to compress the spring to urge the dogs into loose gear-engaging positions, and gears on the other shaft in mesh with the loose gears.

2. A drive shaft, a driven shaft, one of the shafts being hollow and having a slot in its wall, a gear loose on the hollow shaft, a gear fixed to the other shaft in mesh with the loose gear, a flat plate within the hollow shaft, a tooth intermediate the ends of the flat plate to engage a notch in the loose gear, another plate within the hollow shaft parallel with the first, yielding means between the first plate and the wall of the hollow shaft, yielding means between the two plates, and means slidable in the hollow shaft to urge the second plate toward the first.

3. A drive shaft, a driven shaft, one of the shafts being hollow and having a slot in its wall, a gear loose on the hollow shaft, a gear fixed to the other shaft in mesh with the loose gear, a loose-gear engaging dog within the hollow shaft, yielding means between the dog and the wall of the shaft, a member located inwardly from the dog, yielding means between the member and the dog, and means for urging the member radially toward the wall of the hollow shaft to compress both yielding means to urge the dog into gear-engaging position.

4. A drive shaft, a driven shaft, one of the shafts being hollow and having a slot in its wall, a gear loose on the hollow shaft, a gear fixed on the other shaft in mesh with the loose gear, a loose-gear engaging dog within the hollow shaft, a spring between the dog and the wall of the hollow shaft, a member between the dog and the axial center of the hollow shaft, a spring between the member and the dog, the strength of one of the springs preponderating over the strength of the other, and means for urging the member toward the dog in opposition to the springs.

5. A drive shaft, a driven shaft, one of the shafts being hollow and having a slot in its wall, a gear loose on the hollow shaft, a gear fixed on the other shaft in mesh with the loose gear, a loose-gear engaging dog within the hollow shaft, a spring between the dog and the wall of the hollow shaft, a member between the dog and the axial center of the hollow shaft, a spring between the member and the dog, the strength of the spring between the seat and the member being greater than that of the spring between the dog and the hollow shaft, and means for urging the member toward the dog.

6. A drive shaft, a driven shaft, one of the shafts being hollow and having a slot in its wall, a gear loose on the hollow shaft, a gear fixed on the other shaft in mesh with the loose gear, a loose-gear engaging dog within the hollow shaft, a spring between the dog and the wall of the hollow shaft, a member between the dog and the axial center of the hollow shaft, a spring between the member and the dog, the strength of the spring between the seat and the member being greater than that of the spring between the dog and the hollow shaft, means for urging the member toward the dog, and means for adjusting one set of springs.

In testimony whereof I affix my signature.

EDWARD J. KNAPP.